United States Patent
Shimamoto et al.

(10) Patent No.: US 6,883,142 B2
(45) Date of Patent: Apr. 19, 2005

(54) METHOD AND SYSTEM FOR PROVIDING SERVICE TO REMOTE USERS BY INTER-COMPUTER COMMUNICATIONS

(75) Inventors: Nobuyuki Shimamoto, Tokyo (JP); Hiroshi Kaneko, Tokyo (JP)

(73) Assignee: Komatsu Ltd., Tokyo (JP)

( * ) Notice: Subject to any disclaimer, the term of this patent is extended or adjusted under 35 U.S.C. 154(b) by 609 days.

(21) Appl. No.: 09/821,794

(22) Filed: Mar. 30, 2001

(65) Prior Publication Data

US 2001/0037192 A1 Nov. 1, 2001

(30) Foreign Application Priority Data

Apr. 3, 2000 (JP) ........................................ 2000-101428

(51) Int. Cl.⁷ ............................ G06F 3/00; G06F 17/30
(52) U.S. Cl. ...................... 715/744; 715/738; 715/740; 709/217
(58) Field of Search ................................ 345/703, 738, 345/740, 741, 744, 745, 853, 700, 764, 765; 709/201, 203, 217; 715/703, 738, 740, 741, 744, 745, 853

(56) References Cited

U.S. PATENT DOCUMENTS

| | | | | |
|---|---|---|---|---|
| 5,475,819 A | * | 12/1995 | Miller et al. ................ | 709/203 |
| 5,583,761 A | * | 12/1996 | Chou .......................... | 715/536 |
| 5,960,432 A | | 9/1999 | Werner ........................ | 707/10 |
| 5,986,654 A | * | 11/1999 | Alexander et al. ........... | 345/744 |
| 5,987,506 A | * | 11/1999 | Carter et al. ................ | 709/213 |
| 6,038,601 A | * | 3/2000 | Lambert et al. ............. | 709/226 |
| 6,311,190 B1 | * | 10/2001 | Bayer et al. ................ | 707/104.1 |
| 6,542,515 B1 | * | 4/2003 | Kumar et al. ................ | 370/463 |
| 6,559,861 B1 | * | 5/2003 | Kennelly et al. ............ | 345/703 |
| 6,623,529 B1 | * | 9/2003 | Lakritz ........................ | 715/536 |

FOREIGN PATENT DOCUMENTS

| | | |
|---|---|---|
| EP | 0 367 709 A1 | 5/1990 |
| EP | 0 762 299 A1 | 3/1997 |

OTHER PUBLICATIONS

European Search Report dated Jul. 19, 2002 for corresponding European Application No. EP 01 10 8398.7.

* cited by examiner

Primary Examiner—X. L. Bautista
(74) Attorney, Agent, or Firm—Westerman, Hattori Daniels & Adrian, LLP

(57) ABSTRACT

The present invention provides a system which can automatically select a language of a GUI and transaction conditions according to each user. Through the Internet 20, a sales server 10 provides services such as merchandise sales and merchandise auctions to web clients 30, 40 of many users. The web server 10 stores the language codes indicating preferred languages of all users and notations according to various languages for the items constituting various Web pages. Furthermore, the sales server 10 classifies the users into a plurality of groups and stores transaction conditions customized for each group. When a user logs in, the sales server 10 confirms the user's language code and the transaction conditions for that user's group and, dynamically generates a web page with contents matching the transaction conditions for the user's group, using the item notation with the language of that language code, and sends that web page to the web client of the user to be displayed thereon.

4 Claims, 17 Drawing Sheets

FIG. 2

100 USER TABLE

| USER ID | PASSWORD | NAME | LANGUAGE CODE | COMPANY CODE | COMPANY NAME | MEMBER REGISTRATION AUTHORITY | PARENT COMPANY CODE | CONTROLLING COMPANY CODE |
|---|---|---|---|---|---|---|---|---|
| KM0000 | Tokyo | KOMATSU TARO | JP | JP9999 | KOMATSU | ○ | — | JP9999 |
| --- | --- | --- | --- | --- | --- | --- | --- | --- |
| A 0000 | Osaka | USER A | JP | JP1111 | COMPANY A | ○ | JP9999 | JP1111 |
| --- | --- | --- | --- | --- | --- | --- | --- | --- |
| B 0000 | NewYork | USER B | EN | US1111 | COMPANY B | ○ | JP9999 | US1111 |
| --- | --- | --- | --- | --- | --- | --- | --- | --- |
| C 0000 | London | USER C | EN | GB1111 | COMPANY C | ○ | US1111 | US1111 |
| --- | --- | --- | --- | --- | --- | --- | --- | --- |
| D 0000 | Paris | USER D | FR | FR1111 | COMPANY D | — | GB1111 | FR1111 |

FIG. 3

110 LANGUAGE TABLE

| LANGUAGE CODE | SCREEN NUMBER | ITEM NUMBER | TITLE |
|---|---|---|---|
| JP (JAPANESE) | 001 | 1 | BASIC INFORMATION |
| JP | 001 | 2 | MACHINE TYPE |
| JP | 001 | 3 | MACHINE NO. |
| JP | 001 | 4 | MAKER |
| JP | 001 | 5 | COUNTRY OF MANUFACTURE |
| JP | 001 | 6 | CLASS |
| JP | | | |
| JP | 002 | 1 | |
| | | | |
| EN (ENGLISH) | 001 | 1 | |
| EN | 001 | 2 | |
| | | | |

FIG. 6

| | | |
|---|---|---|
| 311 — | BASIC INFORMATION | XXXXXX |
| 312 — | MACHINE TYPE | 530M-1 — 319 |
| 313 — | MACHINE NO. | 301 |
| 314 — | MAKER | KOMATSU |
| 315 — | COUNTRY OF MANUFACTURE | JAPAN — 320 |
| 316 — | CLASS | DUMP TRUCK ALL — 321 |
| 317 — | PRICE (THOUSANDS OF YEN) | POR |
| 318 — | DATE OF MANUFACTURE | 1999/03 |

INVENTORY SEARCH — 322

310

120 OBJECT INFORMATION TABLE

FIG. 8

130 GROUP TABLE

| GROUP | COMPANY CODE |
|---|---|
| GROUP-1 | JP9999 |
| GROUP-1 | JP1111 |
| ⋮ | ⋮ |
| GROUP-2 | US1111 |
| ⋮ | ⋮ |
| GROUP-3 | GB1111 |
| GROUP-3 | FR1111 |
| ⋮ | ⋮ |

FIG. 9

140 PRICE TABLE

| OBJECT NAME | GROUP | PRICE (THOUSANDS OF YEN) |
|---|---|---|
| PC100 | GROUP-1 | 1,100 |
| PC100 | GROUP-2 | 1,000 |
| PC200 | GROUP-1 | 2,000 |
| PC200 | GROUP-2 | 2,000 |
| PC200 | GROUP-3 | 1,900 |
| HD465 | GROUP-1 | 1,500 |
| HD465 | GROUP-3 | 1,400 |
| ⋮ | ⋮ | ⋮ |

FIG. 11

120 OBJECT INFORMATION TABLE

| OBJECT NAME | OBJECT INFORMATION |
|---|---|
| PC100 | --- |
| PC200 | --- |
| HD465 | --- |

130 GROUP TABLE

| GROUP | COMPANY CODE |
|---|---|
| GROUP-1 | JP9999 |
| GROUP-1 | JP1111 |
| GROUP-2 | US1111 |
| GROUP-3 | GB1111 |
| GROUP-3 | FR1111 |

140 PRICE TABLE

| OBJECT NAME | GROUP | PRICE (THOUSANDS OF YEN) |
|---|---|---|
| PC100 | GROUP-1 | 1,100 |
| PC100 | GROUP-2 | 1,000 |
| PC200 | GROUP-1 | 2,000 |
| PC200 | GROUP-2 | 2,000 |
| PC200 | GROUP-3 | 1,900 |
| HD465 | GROUP-1 | 1,500 |
| HD465 | GROUP-3 | 1,400 |

S21 GENERATE COMPANY-CLASSIFIED PRICE TABLE

150 COMPANY-CLASSIFIED PRICE TABLE

| OBJECT NAME | COMPANY CODE | PRICE (THOUSANDS OF YEN) |
|---|---|---|
| PC100 | JP9999 | 1,100 |
| PC100 | JP1111 | 1,100 |
| PC100 | US1111 | 1,000 |
| PC200 | JP9999 | 2,000 |
| PC200 | JP1111 | 2,000 |
| --- | --- | --- |

S22 FIND OBJECTS FROM PRICE TABLE BY USER'S COMPANY CODE

S23 SELECT ONLY MATCHING OBJECTS

S24 SEND TO CLIENT

JP1111 (GROUP-1) 330
PC100 : 1,100
PC200 : 2,000
HD465 : 1,500
---

US1111 (GROUP-2) 340
PC100 : 1,000
PC200 : 2,000
---

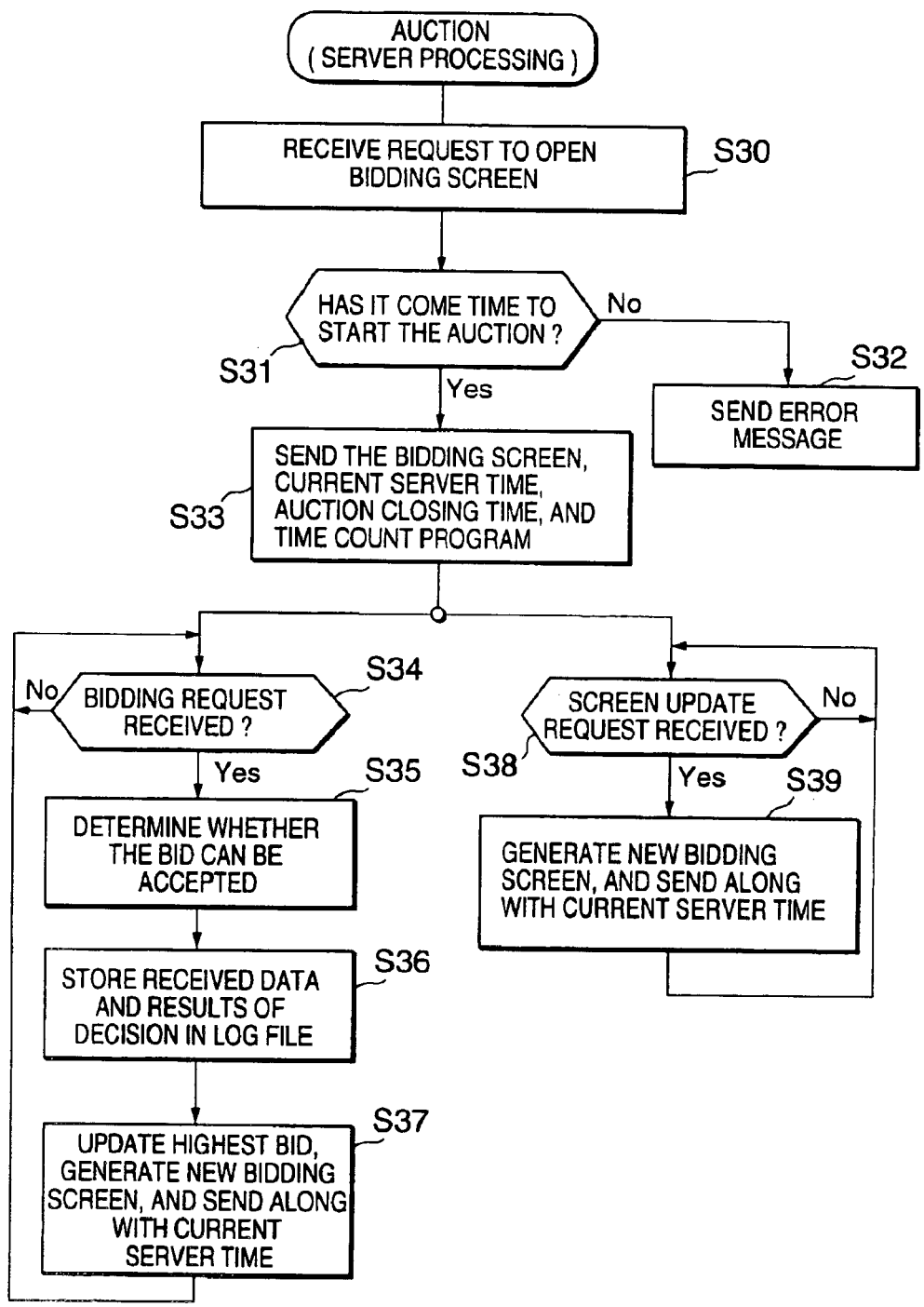

160 COMPANY TABLE

| COMPANY CODE | COMPANY NAME | URL | ----- |
|---|---|---|---|
| JP9999 | KOMATSU TOKYO | http://www.tokyo.komatsu.co.jp/ | ----- |
| ⋮ | ⋮ | ⋮ | ⋮ |

METHOD AND SYSTEM FOR PROVIDING SERVICE TO REMOTE USERS BY INTER-COMPUTER COMMUNICATIONS

BACKGROUND OF THE INVENTION

1. Field of the Invention

The present invention relates to a method and system for providing service to remote users through inter-computer communications.

2. Description of the Related Art

This type of system is represented by systems for providing various services such as providing information, selling merchandise, or holding auctions on the Internet using a WWW server. The advantages of this type of system are the ability to provide service worldwide through the Internet and to allow users to receive service from their homes.

In the case of providing worldwide service, it is necessary to prepare a graphical user interface (GUI) using the various and diverse languages used throughout the world. In the GUIs generally used in conventional WWW services, a list of a plurality of corresponding languages is displayed and when the user picks his or her preferred language from that list, a GUI in that language is opened. However, it is troublesome for the user to select the language used each time he or she accesses that web site. That trouble is compounded especially when the number of possible languages is very large.

Also, in conventional WWW services, the same types of services are generally provided under the same conditions to users throughout the world. However, the service provider may sometimes need to vary the contents of the service and the conditions of commercial transactions according to the user's country, region, or credit-rating because of the different legal systems, regional circumstances, or economic circumstances of various countries.

Also, in worldwide services, it is sometimes necessary to consider the difference between when a communication is sent and when it is received due to the time necessary for data transmission through the telecommunications network, as well as the time differences due to differences in longitude on the planet. In the case of holding an auction on the web site, for example, it is necessary to apply the same ending time impartially to participants throughout the world when the reception of bid proposals stops at the auction ending time. For this reason, the way to handle data transmission times and time differences is not resolved with the conventional art.

Also, in the case of providing service to only those users who are registered in advance (in effect, members), it is sometimes difficult for a single administrator to perform centralized management of the registration procedures for new members in various regions throughout the world, and the contents of the service and the conditions for commercial transactions according to members' countries, regions, and credit-ratings.

SUMMARY OF THE INVENTION

Consequently, it is an object of the present invention to automatically present a GUI for a user in that user's preferred language with a system for providing service to remote users through inter-computer communications.

It is another object of the present invention to be able to automatically vary the conditions of providing service such as the contents of the service and prices according to the user, with a system for providing service to remote users through inter-computer communications.

It is another object of the present invention to be able to impartially apply time-related conditions for providing uniform service to all users, with a system for providing service to remote users through inter-computer communications.

It is another object of the present invention to be able to distribute user registration and management among a plurality of people, with a system for providing service to remote users through inter-computer communications.

It is another object of the present invention to be able to distribute the management of services provided to users among a plurality of people, with a system for providing service to remote users through inter-computer communications.

The method for providing a GUI screen to a user's client system from a server system through inter-computer communications, according to a first aspect of the present invention, comprises: a step for selecting the user's preferred language from among a plurality of prescribed languages based on the attributes of the user and without causing the user to perform an operation to select the language when the user accesses the server system, in order to be able to automatically present that GUI screen in the preferred language of the user; a step for preparing the abovementioned GUI screen in the selected preferred language; and a step for sending and displaying the abovementioned GUI screen in that preferred language on the user's client system.

The method for providing service to a user using a GUI screen from a server system through inter-computer communications, according to a second aspect of the present invention, comprises: a step for storing the conditions of providing service established individually for a plurality of groups in order to be able to automatically vary the conditions of providing service such as the contents of the service and price according to the user; a step for selecting a user's assigned group from among the abovementioned plurality of groups when the user accesses the server system; a step for selecting the conditions of providing service for a user's assigned group from among the conditions of providing service established individually for the abovementioned plurality of groups and preparing a GUI screen appropriate for the conditions of providing service for the selected user's group; and a step for sending and displaying the prepared GUI screen on the user's client system.

The method for providing service to a user from a server system through inter-computer communications, according to a third aspect of the present invention, comprises: a step wherein the server system sends the current time according to the clock of the server system and a GUI screen for a user to issue service requests to the client system in order to be able to impartially apply uniform time-related conditions for providing services to all users; and a step wherein the client system displays the abovementioned GUI screen received from the server system and sends service requests input to this GUI screen by the user to the abovementioned server system; wherein, when the abovementioned GUI screen is displayed on the client system, the current time received from the server system is updated by a time count and service requests are sent to the abovementioned service server system only when the updated current time is within a service provision period indicated by the server system.

The method for providing service to a user from a server system through inter-computer communications, according to a fourth aspect of the present invention, comprises: a step wherein the server system sends the current time according to the clock of the server system and a GUI screen for a user to issue service requests to the abovementioned client system in order to be able to impartially apply uniform time-related conditions for providing services to all users; and a step wherein the client system displays the abovementioned GUI screen received from the server system and sends service requests input to this GUI screen by the user to the abovementioned server system; wherein, when the abovementioned GUI screen is displayed on the client system, the current time received from the server system is updated by a time count and when service requests are input by the user, the updated current time is associated with that service request and that service request is sent to the server system. Furthermore, the server system determines whether that service request was issued within the prescribed service provision period based on the current time associated with the service request received from the client system.

The method for registering new users to a server system through inter-computer communications, according to a fifth aspect of the present invention, comprises: a step for storing authority information indicating whether a registered user has the authority to register members, in order to distribute user registration and management among a plurality of people; a step wherein it is determined, based on the abovementioned authority information, whether a user has member registration authority upon receiving a request to register a new user from a registered user; a step for registering the new user to this server system according to the new user registration request from the user only when that user has member registration authority; and a step for deciding whether to provide user registration authority to a new user and adding the results of that decision to the abovementioned authority information when that new user is registered to the server system.

The method for providing service to users from a server system through inter-computer communications, according to a sixth aspect of the present invention, comprises: a step for storing the addresses of a plurality of GUI screens corresponding to a plurality of controlling organizations for distributed control of users in order to distribute the management of services provided to users among a plurality of people; and a step making it possible to provide service to that user from the GUI screen of a user's controlling organization by selecting the address corresponding to that user's controlling organization from among the abovementioned plurality of addresses upon receiving a service request from a user's client system and sending the GUT screen of that selected address to that user's client system.

The computer programs allowing computer systems to function as the server system and client system discussed above can be installed on the computer or loaded through various types of media such as disk storage, semiconductor memory, and communications networks.

BRIEF DESCRIPTION OF THE DRAWINGS

FIG. 2 is a drawing showing the user table 100 managed by the database server 3;

FIG. 3 is a drawing showing the language table 110 managed by the database server 3;

FIG. 6 is a drawing showing an example of an object information screen generated in Japanese;

FIG. 8 is a drawing showing an example of the group table 130 managed by the database server 3;

FIG. 9 is a drawing showing an example of a price table 140 managed by the database server 3;

FIG. 11 is a drawing showing examples of operations on tables 120, 130, 140 performed in the processing in FIG. 10 and an inventory list screen provided to the user;

FIG. 12 is a flowchart showing processing by the web server 1 when an auction is held;

DESCRIPTION OF THE PREFERRED EMBODIMENTS

A preferred embodiment of the present invention is explained below. This embodiment has the purpose of performing sales of construction equipment on a WWW site on the Internet.

Figure 1:
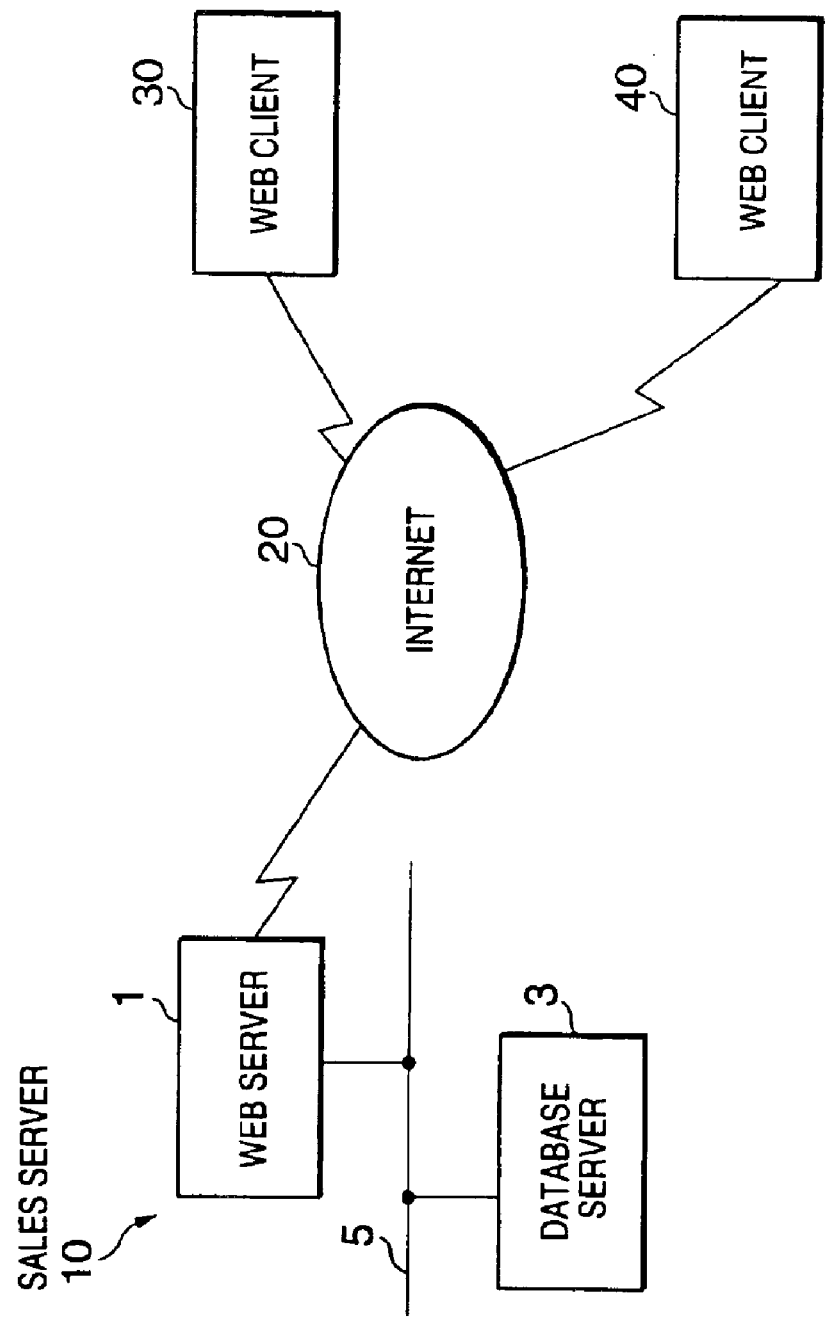
FIG. 1 is a block diagram showing the entire constitution of a first embodiment of the present invention.

FIG. 1 shows the entire constitution of this embodiment.

The sales server computer system (hereinafter "sales server") 10 for performing sales of construction equipment comprises a WWW server computer system (hereinafter "web server") 1 connected to a LAN 5 and a database server computer system (hereinafter "database server") 3. The web server 1 provides various services discussed below in the WWW format to the client computer systems (hereinafter "web clients") 30, 40, . . . used by a plurality of remote users and containing various web browser programs. The database server 3 stores and administers various types of data discussed below which are necessary for processing by the web server 1, and provides these data as necessary to the web server 1.

This sales server 10 provides the following three broad types of services.

(1) Normal Sales of Construction Equipment

Disclose detailed information on the construction equipment for sale to users and receive purchasing orders from users.

(2) Auctions of Construction Equipment

Hold auctions of construction equipment for prescribed periods of time. Users can participate in these auctions at will.

(3) Member Registration

Duly register people wanting to become users as members and manage member information.

The auction server 10 has the following types of functions which are functions that are convenient when carrying out the abovementioned services.

(1) Automatically Select GUI Language According to User

Automatically select the language appropriate for the user when the user logs into the system, generate the web page in that language, and provide the page to the user's web client.

(2) Vary Transaction Conditions According to the User

Be able to divide users into a plurality of groups and vary the transaction conditions, such as objects for sale and prices, according to the user group.

(3) Control the Clocks of Auction Participants

Control the clocks of the web clients of all participants so that when an auction is held, the same auction closing time is applied impartially to all participants.

(4) Hierarchical Member Registration

An administrator can provide authority to register new members to the members which fall under his or her control. Members acquiring this member registration authority can register new members under their own control and provide member registration authority to members under their control. Hierarchical registration of new members thereby becomes possible.

(5) Automatically Select Connection Point According to the User

Determine the controlling company for each user and when the user logs into the system, automatically open the web page of that controlling company on the web client of the user and receive the various services discussed above through the web page of that controlling company.

The mechanism for performing the abovementioned functions is explained below in detail.

The mechanism for the function for automatically selecting the GUI language according to the user is explained here.

Figure 4:
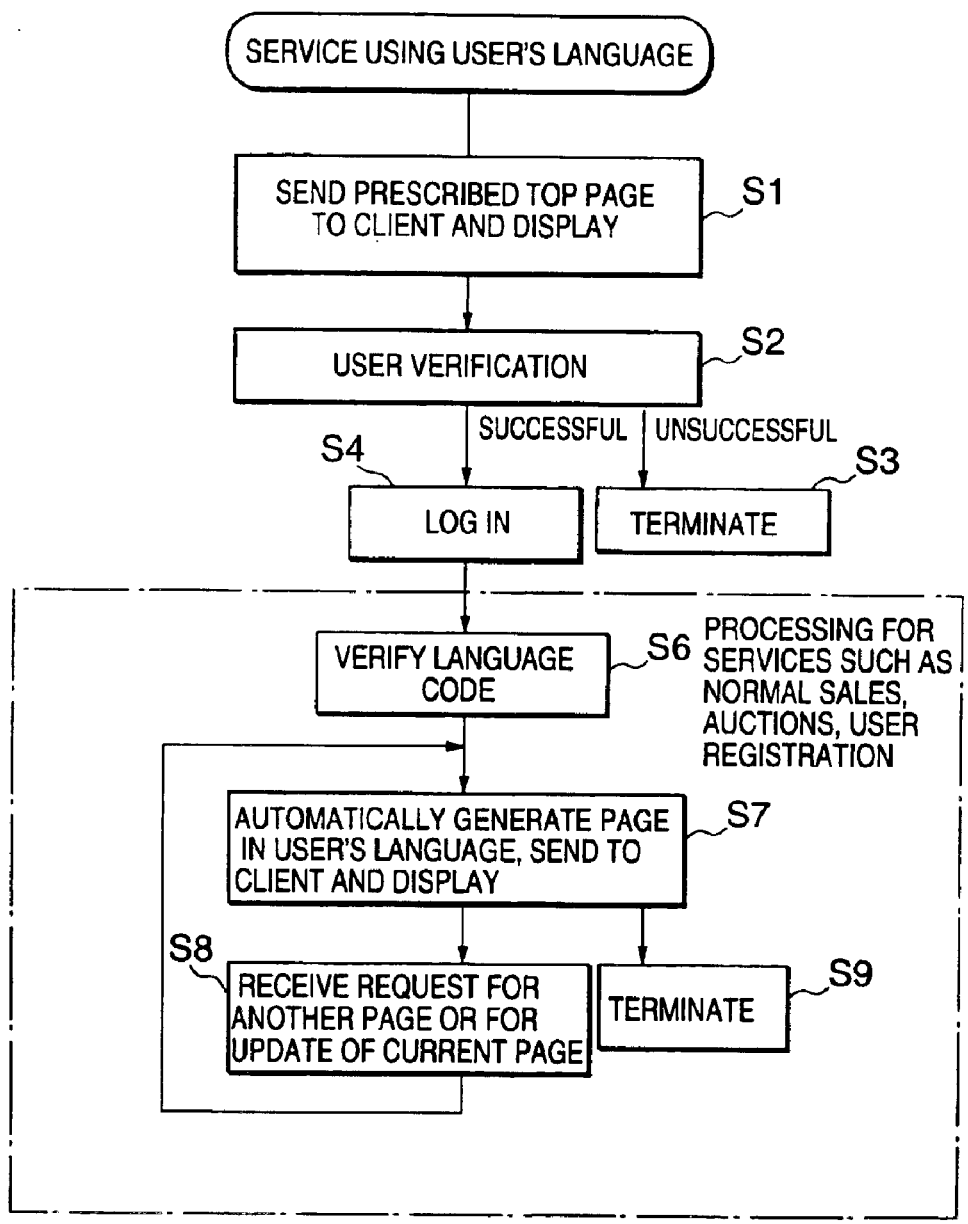
FIG. 4 is a flowchart of the processing whereby the web server 1 determines the preferred language of the user and provides service using that language.
Figure 5:
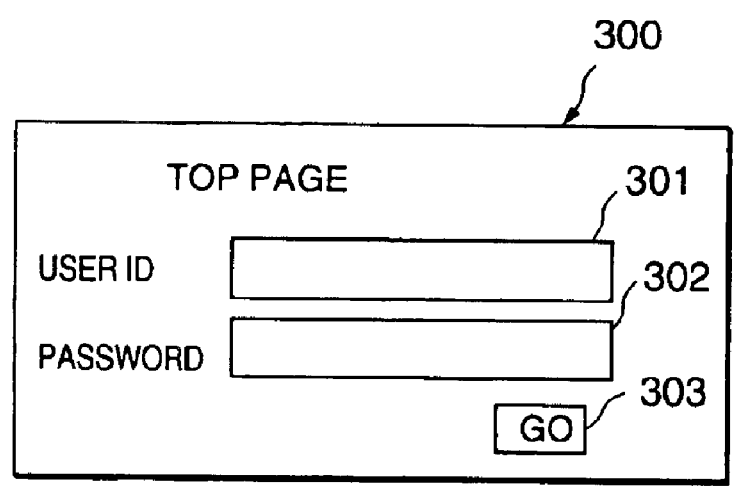
FIG. 5 is a drawing showing an example of a user authentication screen.

FIGS. 2 and 3 show examples of the user table 100 and language table 110 which are managed by the database server 3. FIG. 4 shows the flow of the processing wherein the web server 1 determines the user's preferred language using these tables 100 and 110 and provides services using that language. FIGS. 5 and 6 show examples of a web page (GUI screen) displayed by the web client for the user as a result of this processing.

As shown in FIG. 2, various types of attributes information of each registered user are stored in the user table 100. The attribute information of each user may include the user ID and password particular to that user, the user's full name, the language code indicating that user's preferred language, the company code and company name indicating the company with which the user is affiliated, the member registration authority flag indicating whether that user has the authority to register other new members, a parent company code showing the affiliated company (parent company) of the parent user that registered that user, and a controlling company code showing the company controlling that user with regards to service provision.

As shown in FIG. 3, the notation for when items constituting Web pages are described in the various languages is registered in the language table 110 for all items constituting all web pages (GUI screens) that the web server 4 can provide to the user. In FIG. 3, the language code "JP" indicates Japanese, and "EN" indicates English. The screen number is the identification number for each of the GUI screens; the item number is the identification number for each of the items in each of the GUI screens. The title shows the notation for when an item is described in that language.

For example, in the example in FIG. 3, when the GUI screen with screen number "001" is described in Japanese with the language code "JP", this screen is constituted with items named "Basic Information", "Machine type", "Machine No.", "Maker", "Country of manufacture", and "Classification" (FIG. 6 shows a specific example). Also, when the GUI screen with screen number "001" is described in English with the language code "EN", this screen is constituted of items with English notation having the same meaning as the abovementioned Japanese notation.

FIG. 3 shows only Japanese and English as the languages and only shows screen numbers "001" and "002". However, the notation for all items in all screens is registered in each language to this language table 100 for all of the languages handled by the server.

As shown in FIG. 4, when the web server 1 is initially accessed from a web client, the web server sends the prescribed top page to be displayed on the web client (Step S1). This top page is, for example, the screen 300 as shown in FIG. 5; this is described in one prescribed language (for example, English). If the user types his or her own user ID and password into the user ID field 301 and password field 302 on this top page 300 and clicks the GO button 303, that user ID and password are sent from the web client to the web server 1. The web server 1 performs the user authentication process by searching for that user ID and password in the user table 100 shown in FIG. 2 (S2). ff as a result of this storage the hit user is not found, this is an authentication miss and the server 1 ends the process (S3). On the other hand, if as a result of this search the hit user is found, user authentication is successful and that user is allowed to log in the server 1 (S4).

When the user logs in, the web server 1 provides the abovementioned services (for example, normal sales, auctions, registration of new members, etc.) to a user with web methods. At the start of service, the web server 1 refers to the user table 100 and confirms the language code for that user (S6). In the example in FIG. 2, if that logged in user is "user A", the language code is "JP" (Japanese); if "user B", the language code is "EN" (English); if "user D", at the language code is "FR" (French).

After confirming the language code, the web server 1 reads the notation according to the language of that language code for all items in the web page to be provided to the user from the language table 110, combines the notation for those items, generates that web page, and sends that web page to be displayed on the web client of that user (S7).

FIG. 6 shows an example of 310 of such a web page. This is the screen for disclosing detailed information on the objects for sale to the user; this screen is the screen number "001" in the language table 110 shown in FIG. 3 and is described in Japanese in this example. In the screen 310 shown in FIG. 6, these items having reference numbers 311 through 322 are items for which it is necessary to reference the language table 110 and generate the page as discussed above, because these items have different notations depending on the language. Among these items, the items such as those with reference numbers 311 through 318 and 322 have static contents regardless of the object; the items such as those with reference numbers 319 through 321 have differing contents depending on the object. The language table 110 shown in FIG. 3 shows only those items with static contents, but for those items with differing contents, the notation in all languages for all possible contents of those items is registered in the language table 110. As a result, the notation for those items with differing contents can also be read and used from the language table 110.

After a particular web page is generated and sent, the web server 1 receives a request to open another page (for example a request to jump from the information screen for an object A that is for sale to the information screen for another object B), or a request to update the contents of the same page with the most recent information (for example, a request to update the contents of a bidding screen for an auction with contents showing the latest bidding situation) from the user (S7). Thereupon, the web server generates the new requested web page with the same method as discussed above and sends the page to be displayed on the web client of the user (S7).

In this way, the web server 1 automatically identifies the preferred language for the user registered in the user table 100 when the user logs in, and automatically provides a web page described in the user's preferred language to the user, using the notation for the screen items according to the user's preferred language registered in the language table 110. It is therefore not necessary for a user to take the trouble of selecting a language each time the user accesses the web server 1. Also, the web server 1 dynamically generates the web page described in the user's preferred language when providing the page to the user and as a result, it is not necessary for the web server to store files for all pages in all languages in advance.

Moreover, any number of methods may be employed as the method for automatically selecting the language corresponding to the user, in addition to the method discussed above of registering the preferred language of each user to a table. For example, it is possible to employ methods such as the following (if it is acceptable to generally select the language at the level of the geographical region or company; it may be impossible to specifically select the language for each individual user): the server identifies the user's country or domain on the basis of the user's IP address when the user communicates with the server and automatically selects the language of that country or domain; and the server automatically selects the language appropriate for the user's affiliated company, parent company, or controlling company on the basis of the user's company code, parent company code, or controlling company code written to the user table 100 shown in FIG. 2.

The mechanism of the function for differentiating the transaction conditions according to the user is explained next.

Figure 7:
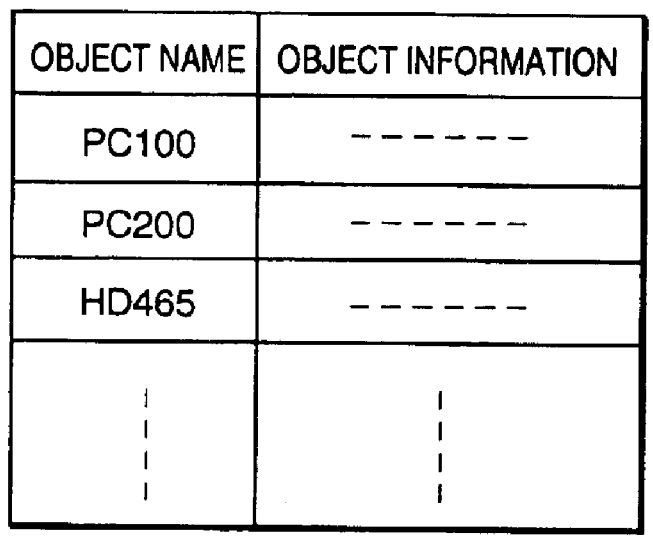
FIG. 7 is a drawing of an example of an object information table 120 managed by the database server 3.
Figure 10:
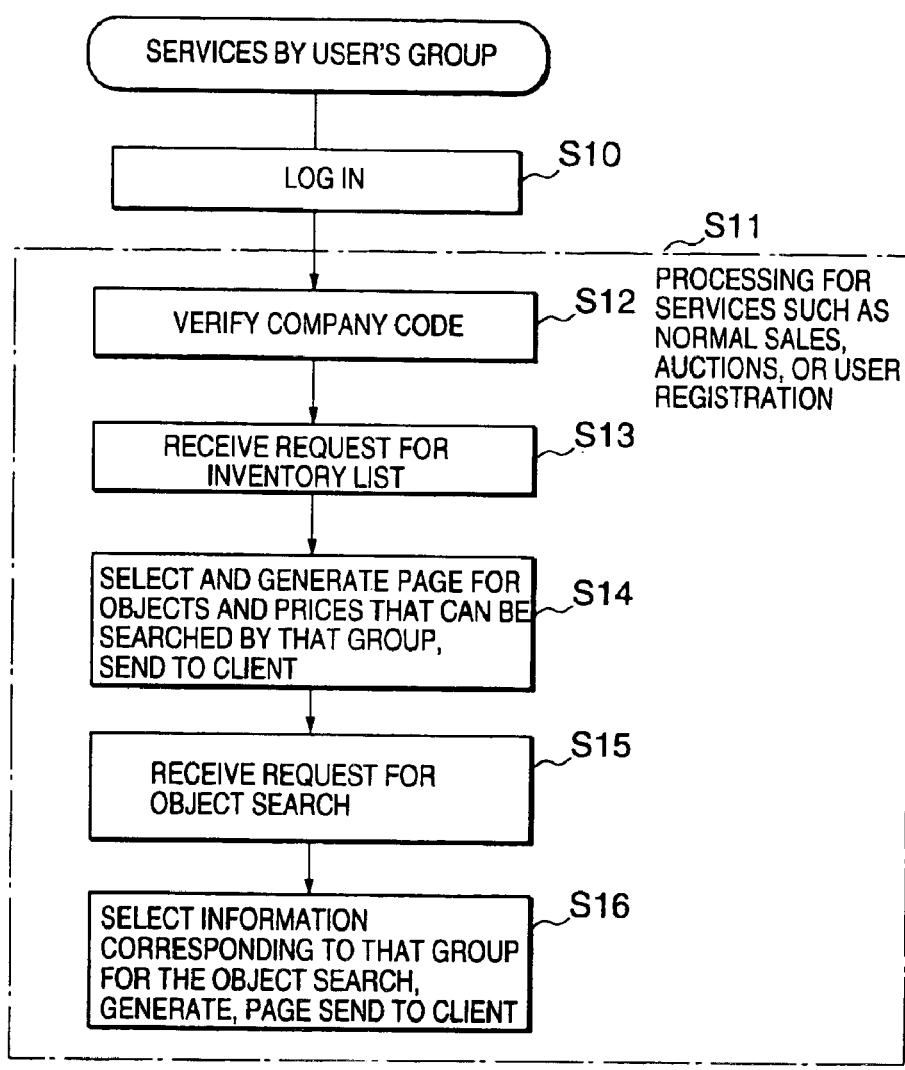
FIG. 10 is a flowchart showing the flow of processing whereby the web server 1 selects the transaction conditions according to the user and provides service to user.

FIGS. 7, 8, and 9 respectively show examples of the object information table 120, group table 130, and price table 140 managed by the database server 3. FIG. 10 shows the flow of the processing for when the web server 1 selects the transaction conditions according to the user using these tables 120, 130, and 140 and provides services to the user. FIG. 11 shows the operations using the tables 120, 130, and 140 performed in the processing in FIG. 10 and an example of the page provided to the user.

As shown in FIG. 7, the object name for all objects (construction machinery) that are for sale and in stock and detailed information for those objects is registered in the object information table 120. There are various possible data formats for the detailed information for the objects registered in this table 120. As one example, information constituting only numbers and codes such as the model numbers and date of manufacture and using a common notation for all languages can be made into text data according to that common notation. Meanwhile, information for which the notation varies depending on the language can be made into pointer information used to read the notation according to any language corresponding to that information from the language table 110 shown in FIG. 3.

As shown in FIG. 8, the results of the administrator of this sales server 10 dividing the affiliated companies of registered users into any number of groups (group name and company code for each company) are stored in the group table 130. In the example in FIG. 8, the companies with company codes "JP9999" and "JP1111" are placed in the group with group name "Group-1"; the company with the company code "US1111" is placed in the group with group name "Group-2"; and the companies with company codes "GB1111" and "FR1111" are placed in the group with group name "Group-3". Any number of groups may be established and the method for classifying the companies into the different groups can be freely established and freely changed by the administrator. For example, classification may be based on country or geographical region, credit rating, or business practices.

As shown in FIG. 9, the object names for all objects (construction machinery) in stock and for sale, the group names for the points of sale of each object, and the sales price for each group of each object are stored in the price table 140. In the example in FIG. 9, the points of sale for the object "PC100" are in only two groups "Group-1" and "Group-2"; "Group-3" is not a point of sale. This means that "PC100" is sold only to "Group-1" and "Group-2", and is not sold to "Group-3". The sales price for "Group-1" is different from the sales price for "Group-2".

In this way, it becomes possible to establish the point of sale group range and the established price by group for all of the various objects in the price table 140. The administrator can freely establish and freely change the sales of any object to any group at any price as required by business practices.

As shown in FIG. 10, when the user logs in (Step S10) (procedures up to login are as shown in FIG. 4 S1 through S3), the web server 1 begins the processing to provide services such as normal sales, auctions, and new member registration to that user (S11). At the start of this service processing, the server references the user table 100 shown in FIG. 2 and learns the company code of the user's affiliated company (S12). After that, upon receiving a request for a stock list of the objects for sale from the user (S13), web server 1 references the price table by company which is prepared in advance, distinguishes only the objects for which the user's company code is a point of sale, generates a web page with a list of the distinguished objects (stock list screen), and sends the page to be displayed on the web client of the user (S14).

The processing details for this Step S14 are shown in greater detail in FIG. 11.

As shown in FIG. 11, the web server uses a group table 130 and price table 140 and generates a company-classified price table 150 in advance (S21). In other words, the groups registered in the price table 140 are divided by individual company codes affiliated with each group according to the group table 130, and the company-classified price table 150 is generated as shown in the drawing. The names of the objects, the company codes for the companies that are points of sale for the objects, and the sales price of each object for each company (=the sales price for the affiliated group of each company) are registered in the company-classified price table 150.

Upon confirming the company code of the user in Step S12 in FIG. 10, the web server 1 uses that company code and searches for the object name and sales price of the object for which the user's company code is a point of sale from the company-classified price table 150 (S22). The web server 1 then matches object names found from the company-classified price table 150 with object names registered in the object information table 130 and selects only the matched object names (S23). The web server 1 then generates a stock list screen using the object names and sales prices of the selected objects and sends the page to be displayed on the web client of the user (S24). Moreover, that stock list screen is described in the user's preferred language as already explained with reference to FIG. 4.

As a result, as shown in FIG. 11, a stock list screen 330 listing only the objects "PC100", "PC200", and "HD465" for which "Group-1" is a point of sale and the sales prices for those objects to "Group-1" is displayed for a user having the company code "JP1111", for example, because that company is affiliated with "Group-1". Also, a stock list screen 340 listing only the objects "PC100" and "PC200" for which "Group-2" is a point of sale and the sales prices for those objects to "Group-2" is displayed for a user having the company code "US1111", for example, because that company is affiliated with "Group-2". The object "HD465" for which "Group-2" is not a point of sale is not included in that stock list screen 340.

In this way, if the administrator establishes a point of sale group range for each object and the price by group in the price table 140 shown in FIG. 9, each user can see on the stock list only the objects for his or her group and prices for his or her group from among the items in stock; the users cannot see the objects and prices for other groups.

Moreover, in the example discussed above, only the types of objects and sales prices were customized for each group in order to simplify the explanation. However, it is also possible to customize various other types of transaction conditions (for example, object delivery conditions, the transaction currency, the exchange rate, etc.) for each group. In that case, the details of those trading conditions customized by object and group are also registered in the price table 140 shown in FIG. 9 and the company-classified price table 150 shown in FIG. 11.

Refer to FIG. 10 once more. In Step S14 as discussed above, when the stock list reflecting the transaction conditions customized for the user's group is shown to the user, the user selects any object from that stock list and sends a search request for that object to the web server 1. When the web server 1 receives this search request for that object (S15), the web server searches for detailed information for that object from the object information table 120 and searches for items corresponding to that object and the user's company code from the company-classified price table 150 and relating to the customizable transaction conditions such as the sales price of that object, generates a web page with the information found for that object, and sends that web page to be displayed on the web client of the user (S16). As a result of this search, an object information screen 310 as illustrated in FIG. 6 is shown to the user. The price displayed on this object information screen 310 is the price customized for the group of the user's affiliated company (by the way, "POR" price on request as shown means that the price should be requested and a fixed amount is not established).

In this way, the transaction conditions customized for each group of user-affiliated companies are automatically selected. Service is performed according to these transaction conditions. If the companies are classified into separate groups, the transaction conditions can also be customized on a company basis. These customized transaction conditions are applied to all server processing relating to those transaction conditions and not only to the display of the stock list and the provision of the object information as explained in the example above.

The control of the clocks of auction participants during an auction and the mechanism for impartially applying the auction closing time to all participants are explained next.

Figure 13:
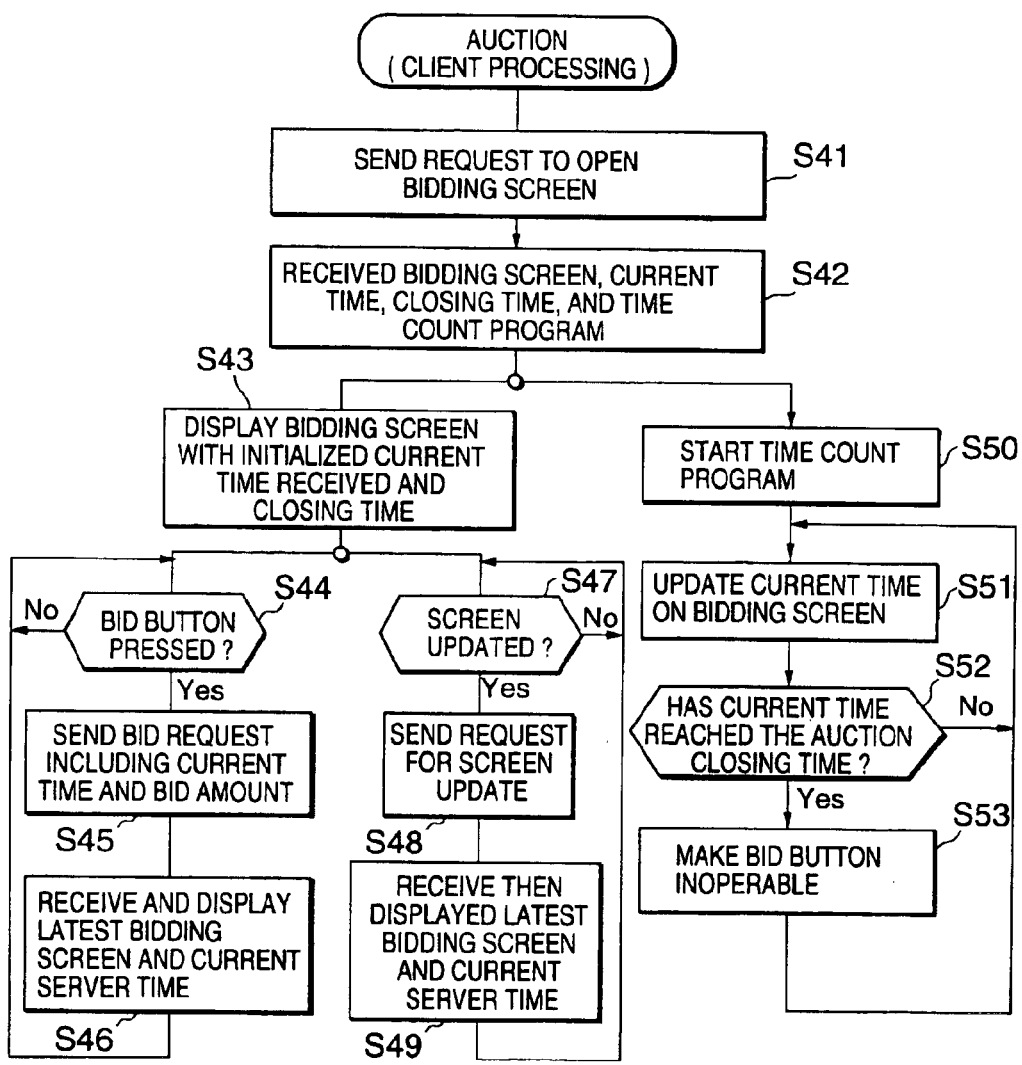
FIG. 13 is a flowchart showing the processing of the web client of each auction participant when an auction is held.
Figure 14:
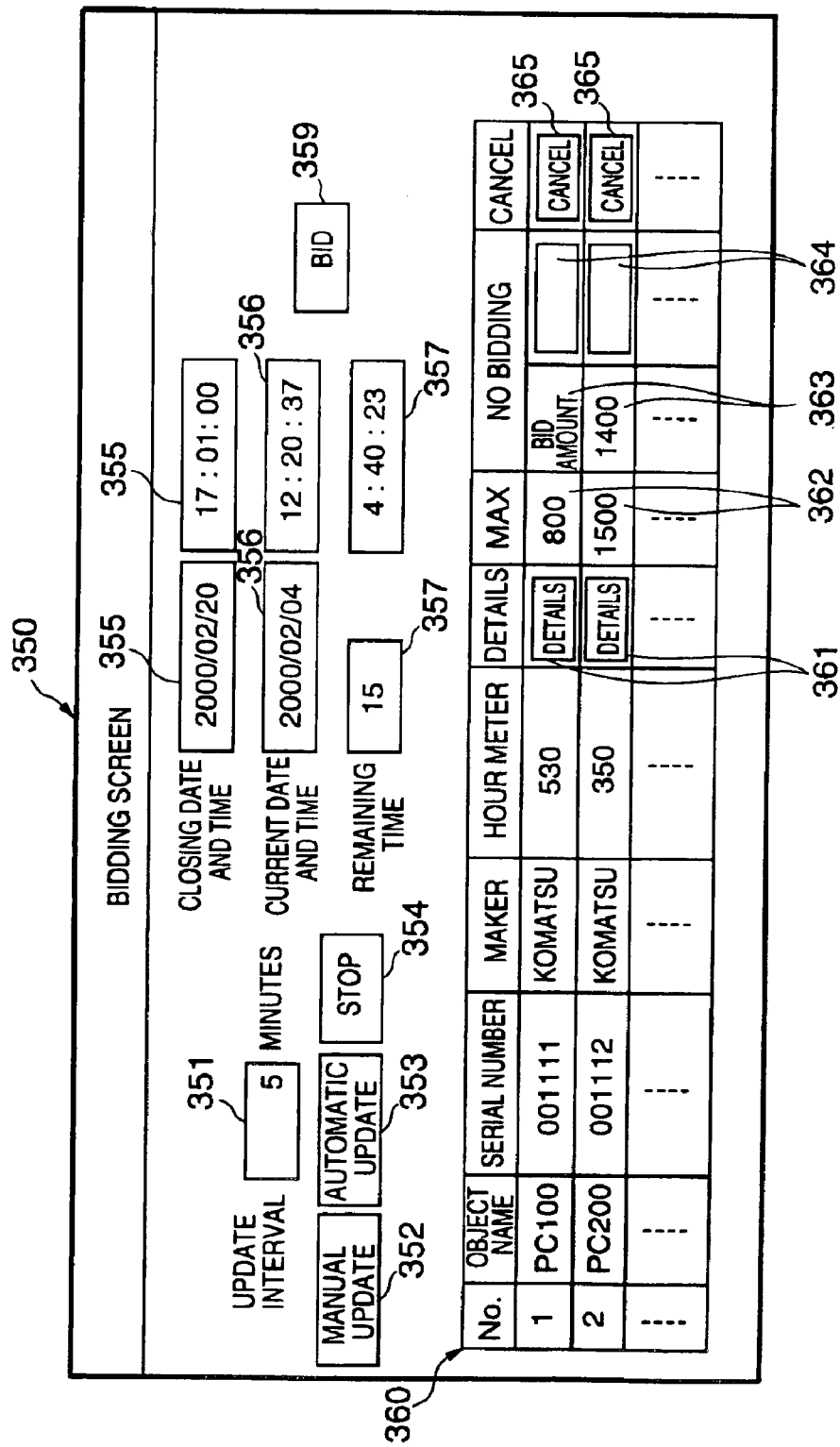
FIG. 14 is a drawing showing an example of a bidding screen displayed on the web client of each auction participant.

FIGS. 12 and 13 show the flow of the processing by the web server 1 during an auction and the flow of the processing by the web client of each auction participant. FIG. 14 shows an example of a bidding screen displayed on the web client of each auction participant.

Before an auction is held, the administrator sets the starting time and closing time for the auction as expressed by the time of the web server 1, and declares the auction starting time and closing time on a prescribed web page, so that interested users can confirm the starting time and closing time of the auction.

As shown in FIG. 13, users who want to participate in the auction (after logging in to the server) send a request to open the bidding screen (illustrated in FIG. 14) for the auction to the web server 1 (S41). As shown in FIG. 12, upon receiving a request to open the bidding screen from the web client (S30), the web server 1 checks whether the current time of the server 1 has reached the auction starting time (S31), and if it is not yet the auction starting time, sends an error message to the web client (S32). If the current time has already reached the auction starting time, the web server 1 generates the web page for the bidding screen in the user's desired language using the method already explained and sends the web page for that bidding screen to the user's web client (S33). At that time, the web server 1 sends the current time of the server 1, the auction closing time expressed in the server time, and a time count program (for example, in JavaScript from Sun Microsystems) to the web client of the user in addition to the web page of the bidding screen (S33).

As shown in FIG. 13, upon receiving the web page of the bidding screen, the current time of the web server 1, the auction closing time expressed in server time, and a time count program from the web server 1 (S42), the web client initializes this received current time and auction closing time in the received bidding screen and displays that bidding screen (S43). At the same time, web client automatically starts and runs the received time count program (S50). The time count program counts elapsed time and updates the current time on the bidding screen at one second intervals, for example, (S51) and checks whether the current time has reached the auction closing time on the bidding screen at each update (S52).

The bidding screen displayed on the web client is that shown in FIG. 14.

The auction closing time (date and time) is displayed in the closing date and time field 355 in this bidding screen 350. The current time (date and time) updated at one second intervals is displayed in the current date and time field 356. The remaining time (number of days and time) from the current time until the auction closing time is displayed in the remaining days and time field 357. This remaining time is also calculated with the time count program and updated at one second intervals. The auction closing time and current time displayed on this bidding screen 350 are expressed in the time of the web server 1 as clear from the explanation above and is the same for all auction participants throughout the world.

The bidding screen 350 includes a bid button 359 and an object table 360 wherein all objects up for auction are displayed. The object table 360 displays the object name, serial number, maker, and principal related information such as an hour meter for each object. Meanwhile, there is a details button 361 which, if pressed, can reference more detailed information for each object. The object table 360 also displays a current highest bid (MAX) 362 and the bid amount which that user has placed up till the current time (or "no bid" in the case of no bidding). Furthermore, the object table also displays a field 363 where a user can input a new bid and a cancel button 365 for clearing the amount input to that field 364.

When the user places a bid on a specific object, the user inputs the desired bid amount to the bid amount field 364 for that object in the object table 360 and presses the bid button 359.

The bidding screen 350 includes a manual update button 362, an automatic update button 353, and update interval field 351, and a stop button 354. With the manual update button 362, the details of this bidding screen 350 (particularly the current highest bid 362 for each object) is updated to the most recent information at that time. When the automatic update button 363 is pressed by a user, the details of the bidding screen 350 are then automatically updated, at the time interval established in the update interval field 351, to the most recent information at that time. When the stop button 354 is pressed by a user, the automatic updates are then not performed until the user presses the automatic update button 363 once more.

Refer to FIG. 13 once more. When the user inputs a bid for a specific object and presses the bid button 359 on the bidding screen 350 discussed above (S44), the web client sends the current time on the bidding screen 350 and the bid request including that bid amount to the web server 1 (S45). As shown in FIG. 12, upon receiving that bid request (S34), the web server 1 decides to accept that bid request if the bid amount included in the bid request is greater than the current highest bid or to decline that bid request if the amount is not higher (S35), and saves the data of the bid request received along with the results of that decision (current time, bid amount, user ID, etc.) in the log file of the web server 1 (or in the database server 3) (S36). The web server 1 then updates the highest bid to the bid amount in the accepted bid request (if that bid request is accepted), generates the latest bidding screen wherein the current, most recent highest bid is displayed, and sends this most recent bidding screen to the web client of the user (S37). At this time, the web server 1 sends the current time of the server 1 along with this latest bidding screen to the web client (S37). Thereupon, as shown in FIG. 13, the web client receives the latest bidding screen and the current time of the web server 1, and displays this latest bidding screen with the current time received established in the current date and time field 356 of the latest bidding screen (S46).

Also, as shown in FIG. 13, upon reaching the periodic update time after the manual update button 352 on the bidding screen 350 is pressed or the automatic update button 353 is pressed (S47), the web client sends a screen update request to the web server 1 (S48). As shown in FIG. 12, upon receiving this screen update request (S38), the web server 1 generates the latest bidding screen wherein the current, most recent highest bid is displayed and sends this latest bidding screen to the user's web client (S39). At this time, the web server 1 also sends the current time of the server 1 along with the latest bidding screen to the web client (S39). Thereupon, as shown in FIG. 13, the web client receives the latest bidding screen and the current time of the web server 1 and displays this latest bidding screen with the received current time set in the current date and time field 356 in the latest bidding screen (S49).

While the auction is being held, the user's bids and the latest bidding situation is provided to the user as discussed above. During this time, as shown in FIG. 13, the time count program operating on the web client updates the current time on the bidding screen 350 at one second intervals as discussed above (S51). When this current time reaches the auction closing time (Yes in S52), the time count program makes it impossible to operate the bid button 359 on the bidding screen 350 (S53) and thereby makes it impossible for the user to make a bid thereafter.

With the processing discussed above, all auction participants can use a common current time and a common auction closing time according to the web server 1 and place bids until that current time reaches the auction closing time. Upon receiving a bid request, the web server 1 stores that bid request, along with the current time at which that bid request was issued and which is appended to that bid request, in the log file. If the current time appended to that stored bid request is before the auction closing time, that bid request is determined to be within the auction closing time even if the bid request was received after the auction closing time. For this reason, even if the web server 1 receives the bid request after the auction closing time because of transmission time over the network, that bid request is accepted if the time at which the bid request was issued by the web client is before the auction closing time. Consequently, the same time constraints can be impartially applied to all auction participants throughout the world.

In the explanation above, the current time and auction closing time sent from the web server 1 to the client system are the time shown by the clock of the web server 1. It is not necessarily the case that this must be so, however, and as long as it is the time according to the clock of the web server 1, this time may also be converted to the local time used by the client system by adding or subtracting the time difference between the local time used by the web server 1 and the local time used by the client system. For example, if the web server 1 uses Tokyo time and the client system uses London time (Tokyo time minus 9 hours), then the current time and the auction closing time which are in Tokyo time used by the web server 1 may be converted to London time by subtracting nine hours and used by the client system.

Next, the mechanism for hierarchical member registration is explained.

Figure 15:
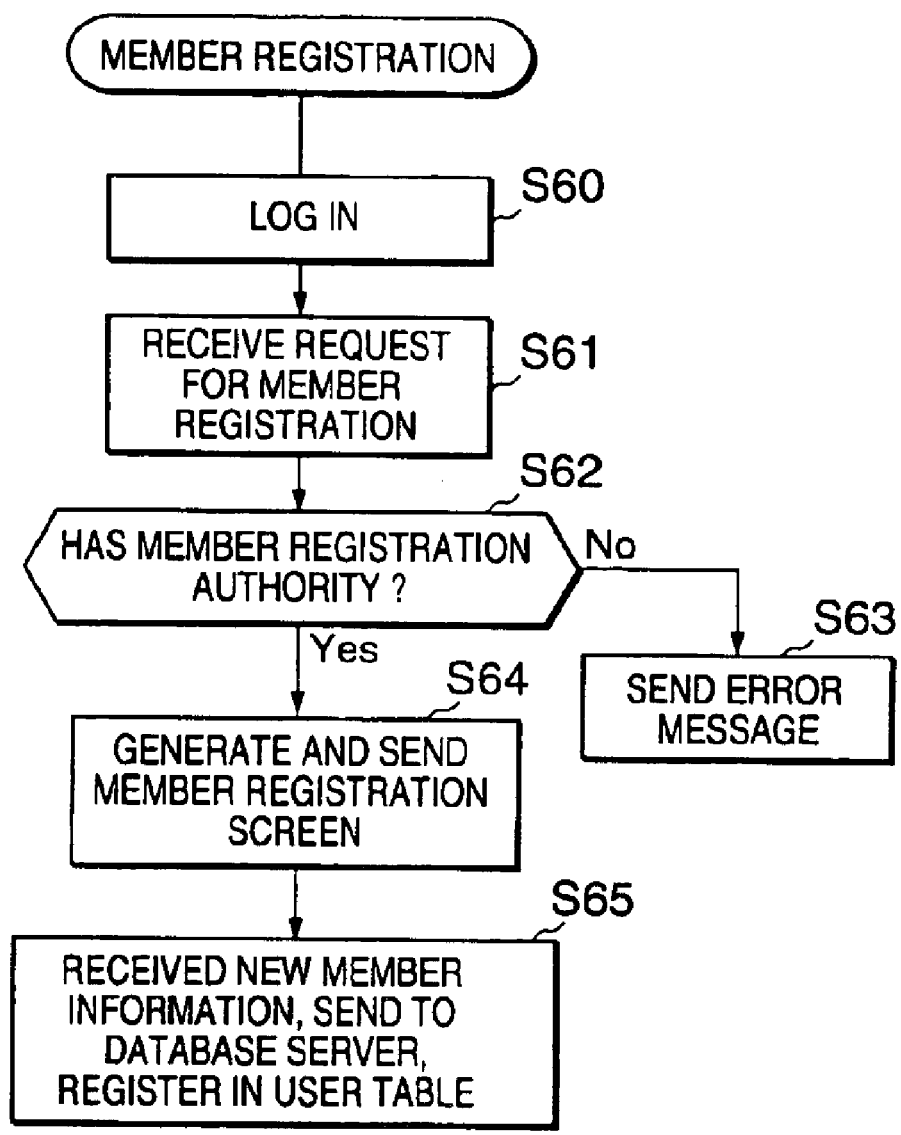
FIG. 15 is a flowchart showing the processing by the web server 1 when performing member registration.
Figure 16:
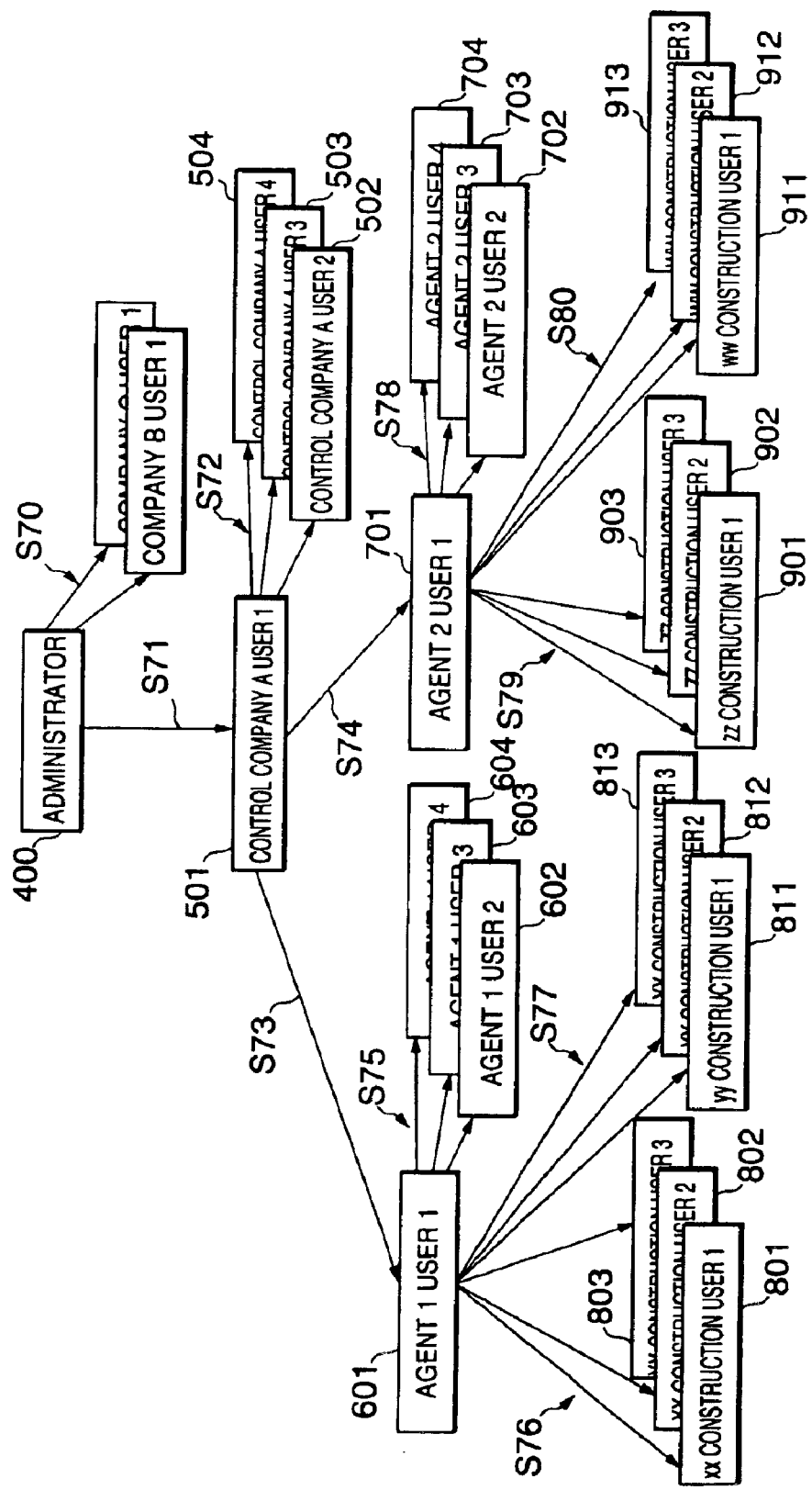
FIG. 16 is a drawing to explain how hierarchical member registration works.

FIG. 15 shows the flow of processing by the web server 1 when performing member registration. FIG. 16 is a drawing to explain how hierarchical member registration works.

As shown in FIG. 15, after a user has logged in (Step S60) (procedures until login are as shown in S1 through S3 in FIG. 4), and when the web server 1 receives a request for member registration from that user (S61), the web server references the user table 100 shown in FIG. 2 and checks whether that user has member registration authority (S62). For example, in the example of the user table 100 in FIG. 2, the user with the user ID "KM0000" has member registration authority (in the drawing, a circle is marked in the member registration authority field), but the user with the user ID "D0000" does not have member registration authority (in the drawing, a minus is marked in the member registration authority field). If that user does not have member registration authority from the result of the check in Step S62, the web server 1 sends an error message to the web client of that user and denies member registration (S63). On the other hand, if that user does have member registration authority, the web server 1 generates the web page for the member registration screen in the preferred language of that user and sends that web page to be displayed on the web client of that user (S64).

The user inputs the items necessary to register a new member (new user) (information to be stored in the user table 100 such as user ID, password, full name, preferred language, affiliated company name, and whether the user will be granted member registration authority) to the member registration screen displayed, and sends the input information on the new member to the web server 1. The web server 1 receives the new member information, sends it to the database server 3, and saves it in the user table 100 (S65). At this time, the database server 3 automatically determines the parent company code and controlling company code for the new member and saves this in the user table 100, as shown in FIG. 2, in addition to the data of the new member information received from the user (in effect, the user ID, password, full name, language code for the preferred language, company code and company name for the affiliated company, and whether the user will be granted member registration authority). Here, the parent company code is the company code of the company affiliated with the user to registered that member. Also, the controlling company code is the company code for the agent company (controlling company) for controlling the actual services to that member. For example, in the case where different agent companies for different regions control the services, the controlling company is determined from the address or place of business of that member.

In this way, a registered user having member registration authority can register new members. What should be noted about that procedure is that a user having member registration authority can decide whether to provide member registration authority to that new member when registering new members. Accordingly, a new member who is registered and given this member registration authority can then register other new members and at that time can decide whether to provide member registration authority to those other new members. In this way, hierarchical member registration becomes possible by providing member registration authority to the members under one's command.

In other words, as shown in FIG. 16, only the administrator 400 of the sales server 10 has user registration authority and can freely register users (Step S70). That administrator 400 newly registers "user 1" 501 from "control company A" and provides member registration authority (S71). Thereupon, "user 1" 501 from "control company A" becomes able to newly register other users 502 through 504 from the same company (S72) and users 601 and 701 from another company (S73, S74). That "user 1" 501 from "control company A" registers "user 1" 601 from "agent 1" and "user 1" 701 from "agent 2" and provides member registration authority to these (S73, S74). Thereupon, that "user 1" 601 from "agent 1" and "user 1" 701 from "agent 2" become able to freely register users 602 through 604 and 702 through 704 from the same companies (S75, S78), and users (for example, end users) 801 through 803, 811 through 813, 901 through 903, and 911 through 913 from other companies (S76, S77, S79, S80).

In this way, even if the administrator 400 does not register all the users, hierarchical user registration is performed as follows. The user 501 having member registration authority and being under the control of the administrator 400 registers individual users 502 through 504, 601, 701 under the control of that user 501; then the users 601 and 701 having member registration authority register other users under their own control. The hierarchical, vertical relationship wherein users are under the control of other users (companies) is shown by the parent company codes in the user table 100 shown in FIG. 2. The administrator 400 can understand the uppermost relationship of the users with the parent company code and therefore, without controlling all users himself or herself, can make a parent company responsible for the management of the users under its control and can perform user management in a diffused manner.

The hierarchical, vertical relationship according to the parent company codes can be combined with the function for customizing transaction conditions discussed above. For example, transaction conditions applied to a parent company group are automatically applied to users under the control of that parent company in principle. In the example in FIG. 11, even if the end users 801 through 803, 811 through 813, 901 through 903, and 911 through 913 are divided into different groups, the transaction conditions for the parent companies are automatically applied to the end users 801 through 803, 811 through 813, 901 through 903, and 911 through 913 if the agents that are parent companies or control companies that are parent companies are divided into groups.

The mechanism for automatic selection of connection points corresponding to the users is explained next.

Figures 17, 18:
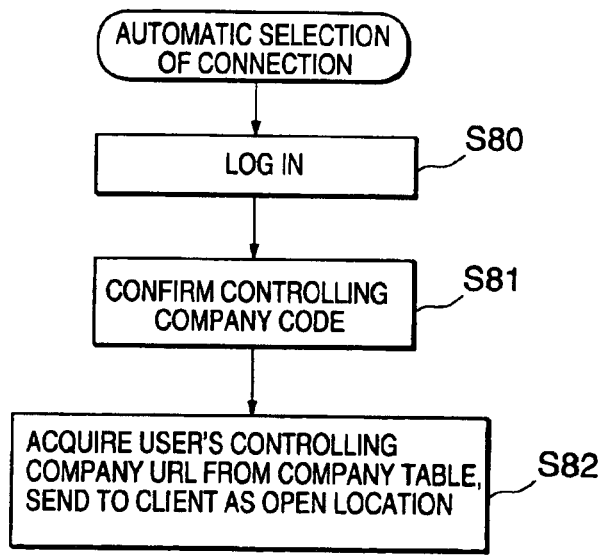
FIG. 17 is a drawing showing an example of a company table 150 managed by the database server 3.
FIG. 18 is a flowchart showing the processing when the web server 1 automatically distinguishes a connection point according to the user.

FIG. 17 shows an example of a company table 160 which is managed with the database server 3. FIG. 18 shows the process flow for the web server 1 automatically selecting the connection points corresponding to the users.

As shown in FIG. 17, the company codes for the various companies which can be the users' controlling companies such as agents, company names, and the URLs for those companies' home pages are stored in the company table 160.

As shown in FIG. 18, when a user logs in (Step S80) (the procedures until login are as shown in S1 through S3 in FIG. 4), the web server 1 references the user table 100 shown in FIG. 2 and recognizes the company code for the user's controlling company (S81). Next, the web server 1 extracts the home page URL for the controlling company from the company table 160 and sends that URL to the user's web client as the open location (S82). Thereupon, the web client of the user's receives the URL for the controlling company's home page and sends a request to open that URL. The URLs for the controlling company home pages registered in the company table 160 may also all be stored together in the web server 1 of the sales system 10 or they may be distributed among a plurality of web servers on the Internet. In any event, the web server having the URL for the controlling company home page receives the request to open the URL of the controlling company home page from the user and then can generate and provide to the user the controlling company home page in the user's preferred language by performing the procedures after Step S6 in the process flow for providing service in the user's preferred language shown in FIG. 4. Also, in the case where that user advances from that home page to a service screen such as a stock list or object search, the web server having the URL for the controlling company home page can provide those services under the transaction conditions customized for the group of the controlling company or affiliated company of the user by performing the procedures after Step S12 in the process flow for providing transaction conditions services by group shown in FIG. 10. Also, in the case where that user advances from that home page to an auction bidding screen, the web server having the URL for the controlling company home page can allow the user to participate in the auction under the same equal time conditions as other users by performing the procedures shown in FIG. 12. Also, in the case where that user advances from that home page to a member registration screen, the web server having the URL for the controlling company home page can allow the user to register new members, in the case where that user has member registration authority, by performing the procedures after Step S61 in the process flow for member registration shown in FIG. 15.

In this way, the logged in user initially accesses the home page for that user's controlling company and then advances from the home page of the controlling company to various types of service pages; it thereby becomes possible to distribute the management of services provided to users among the controlling companies.

An embodiment of the present invention was explained above, but this embodiment has the purpose of illustrating the explanation of the present invention and does not mean that the present invention is limited to only the abovementioned embodiment. Consequently, the present invention can be realized with various forms other than the abovementioned embodiment.

What is claimed is:

1. A method for providing service to a remote user from a server system through inter-computer communications between said server system and the client system of said remote user, comprising the steps of:

storing addresses in said server system for a plurality of GUI screens corresponding respectively to a plurality of controlling organizations for distributed control of users; and upon receiving a service request from a client system of a user, selecting an address corresponding to the controlling organization which controls said user from among said plurality of addresses, and sending a GUI screen for this selected address to the client system of said user in order to provide service to said user from the GUI screen of the controlling organization controlling said user.

2. The method according to claim 1, wherein:

said plurality of controlling organizations are related hierarchically to each other, each of said plurality of controlling organizations is associated with one of said GUI screens.

3. A server system for providing service to a remote user through inter-computer communications between said server system and a client system of said remote user, comprising:

means for storing addresses in said server system for a plurality of GUI screens corresponding respectively to a plurality of controlling organizations for distributed control of users; and means for selecting, upon recieving a service request from a client system of a user, an address corresponding to the controlling organization which controls said user from among said plurality of addresses, and sending the GUI screen with this selected address to the client system of said user for providing service to said user from the GUI screen of the controlling organization controlling said user.

4. The server system according to claim 3, wherein;

said plurality of controlling organizations are related hierarchically to each other, each of said plurality of controlling organizations is associated with one of said GUI screens.

* * * * *